(12) United States Patent
Dent et al.

(10) Patent No.: US 9,076,135 B2
(45) Date of Patent: Jul. 7, 2015

(54) APPARATUS, METHOD AND COMPUTER-READABLE MEDIA FOR PRE-PROCESSING INFORMATION ASSOCIATED WITH A NEGOTIABLE INSTRUMENT TO IDENTIFY OPTIONS FOR PROCESSING THE NEGOTIABLE INSTRUMENT

(71) Applicant: Bank of America Corporation, Charlotte, NC (US)

(72) Inventors: Nathan Dent, Concord, NC (US); James David Freedman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 14/043,912

(22) Filed: Oct. 2, 2013

(65) Prior Publication Data
US 2015/0090782 A1    Apr. 2, 2015

(51) Int. Cl.
  *G07F 19/00*    (2006.01)
  *G06Q 20/10*    (2012.01)
(52) U.S. Cl.
  CPC .............. *G06Q 20/10* (2013.01); *G07F 19/202* (2013.01)
(58) Field of Classification Search
  CPC .................................................. G06Q 20/042
  USPC .................................. 235/379.38; 705/44, 45
  See application file for complete search history.

(56) References Cited

U.S. PATENT DOCUMENTS

| | | | |
|---|---|---|---|
| 6,282,523 B1 | 8/2001 | Tedesco et al. | |
| 6,848,611 B1 | 2/2005 | Higgins | |
| 7,337,971 B2 | 3/2008 | Melick et al. | |
| 8,260,707 B2 | 9/2012 | Treadwell et al. | |
| 8,494,958 B2 | 7/2013 | Schoenberg et al. | |
| 2004/0133516 A1* | 7/2004 | Buchanan et al. | 705/42 |
| 2005/0087594 A1* | 4/2005 | Phillips et al. | 235/379 |
| 2005/0097046 A1* | 5/2005 | Singfield | 705/42 |
| 2012/0160912 A1 | 6/2012 | Laracey | |
| 2013/0124855 A1 | 5/2013 | Varadarajan et al. | |
| 2013/0179336 A1 | 7/2013 | Lyons et al. | |
| 2015/0019437 A1* | 1/2015 | Smith et al. | 705/45 |

* cited by examiner

*Primary Examiner* — Jamara Franklin
(74) *Attorney, Agent, or Firm* — Banner & Witcoff, Ltd.; Michael A. Springs (57) ABSTRACT

Systems, methods, computer-readable media and apparatuses pre-processing a negotiable instrument, such as a check, are presented. An image of a portion of the check may be received, such as from a mobile device of a user. The portion provided in the image may include a convenience area of the check identifying an amount of the check as a numerical value and a quick response (QR) code. The QR code may contain data such as that contained in the magnetic ink character recognition (MICR) line of the check. The image may be processed to identify one or more options available for continued processing of the check or for cancelling the transaction. The options may be provided to the user, such as via a user interface. In some examples, the user interface may be provided on the mobile device used to capture the image of the portion of the check.

22 Claims, 9 Drawing Sheets

APPARATUS, METHOD AND COMPUTER-READABLE MEDIA FOR PRE-PROCESSING INFORMATION ASSOCIATED WITH A NEGOTIABLE INSTRUMENT TO IDENTIFY OPTIONS FOR PROCESSING THE NEGOTIABLE INSTRUMENT

BACKGROUND

Conducting financial transactions has become increasingly automated. For instance, some users may conduct most or all of their banking via automated teller machines (ATMs), online banking and/or mobile banking applications. However, in some instances, feedback provided using these methods of conducting transactions might not be as robust as dealing with a teller. Further, in some circumstances, a transaction may be processed without the user fully understanding one or more aspects of the transaction and, in some systems, there might not be a way to cancel the transaction once it has been processed.

For example, a user may desire to deposit the amount of a check into an account using an ATM. In some examples, the financial institution may place a temporary hold on some or the entire amount of the check (e.g., the full amount of the check might not be immediately available to the user). In some examples, the hold information might not be communicated to the user until after the deposit transaction is complete. At that point, it may not be possible for the user to retrieve the check. Thus, the user will have no choice but to process the transaction and wait for the funds to become available. These conventional systems may cause inconveniences for the user.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems and apparatuses for pre-processing a negotiable instrument, such as a check. An image of a portion of the check may be received, such as from a mobile device of a user. The portion provided in the image may include a convenience area of the check identifying an amount of the check as a numerical value and a quick response (QR) code. The QR code may contain data such as that contained in the magnetic ink character recognition (MICR) line of the check. The image may be processed to identify one or more options available to the user for continued processing of the check or for cancelling the transaction. The options may be provided to the user, such as via a user interface. In some examples, the user interface may be provided on the mobile device used to capture the image of the portion of the check.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Aspects described herein relate to use of a quick response (QR) code on a negotiable instrument, such as a check, to provide pre-processing capabilities. For instance, a QR code may be arranged on a check near, for instance, a convenience area, such that an image of a portion of the check (e.g., the portion including the QR code and the convenience area) may be transmitted to a system. The QR code may include data associated with the account on which the check is drawn, a routing number associated with the check, a check number, and the like. In some examples, the QR code may include the information visible in the magnetic ink character recognition (MICR) line located in a bottom region of the check. Accordingly, processing of the image including the QR code and convenience area will provide sufficient information about the amount of the check and account on which the check is being drawn to determine whether the check is valid, whether sufficient funds exist to cash the check, whether a hold will be placed on the check when cashed or deposited such that a portion or the entire amount of the check might not be immediately available until after a predetermined period of time, and the like. Based on the pre-processing, the payee may determine whether to proceed with a transaction or cancel a transaction. These and various other aspects will be described more fully below.

Figure 1:
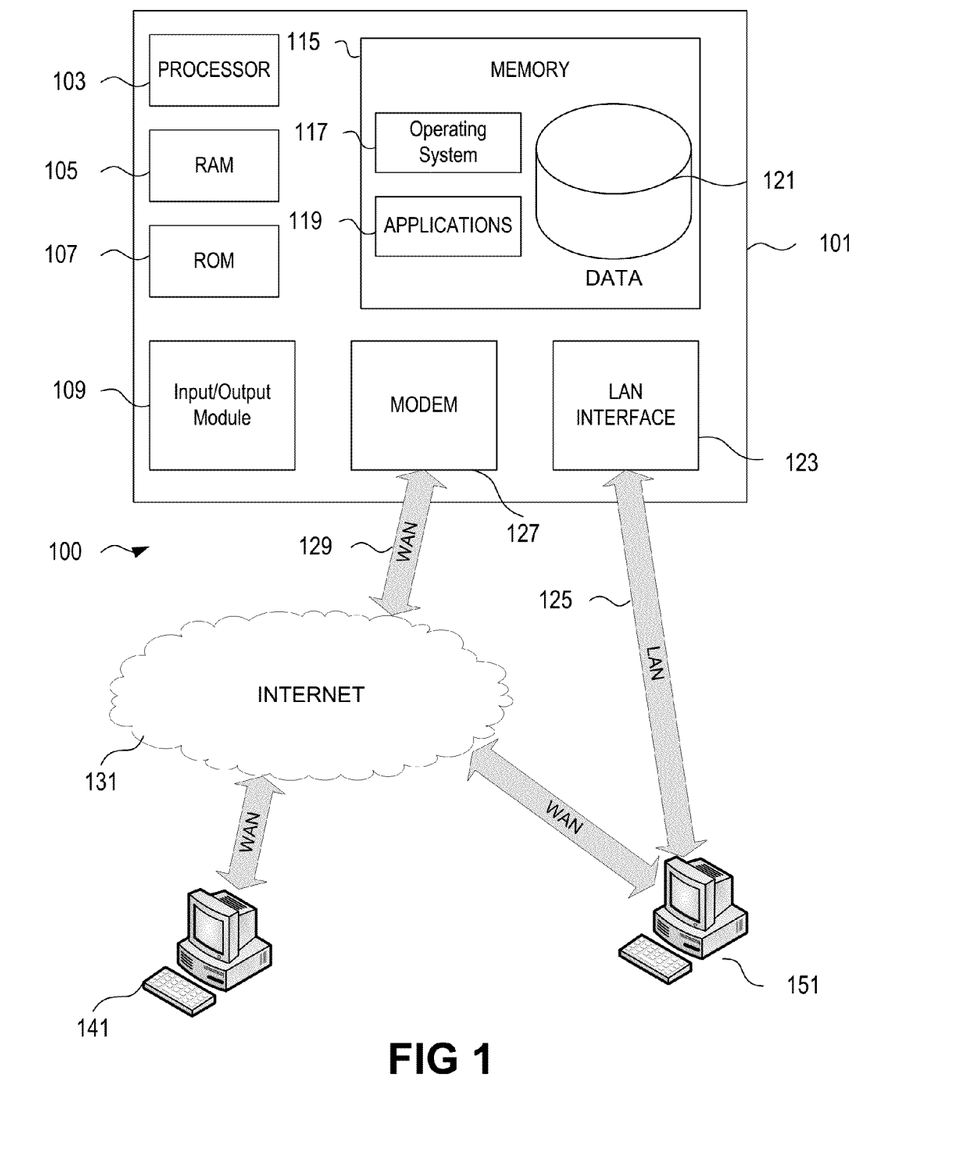
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
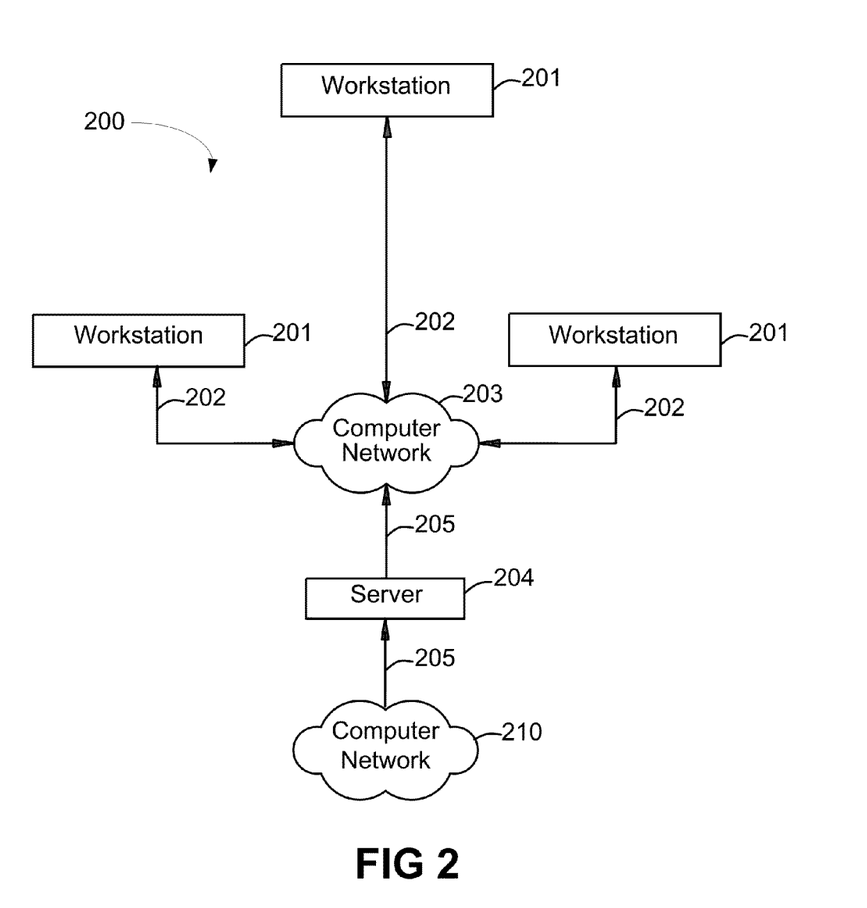
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
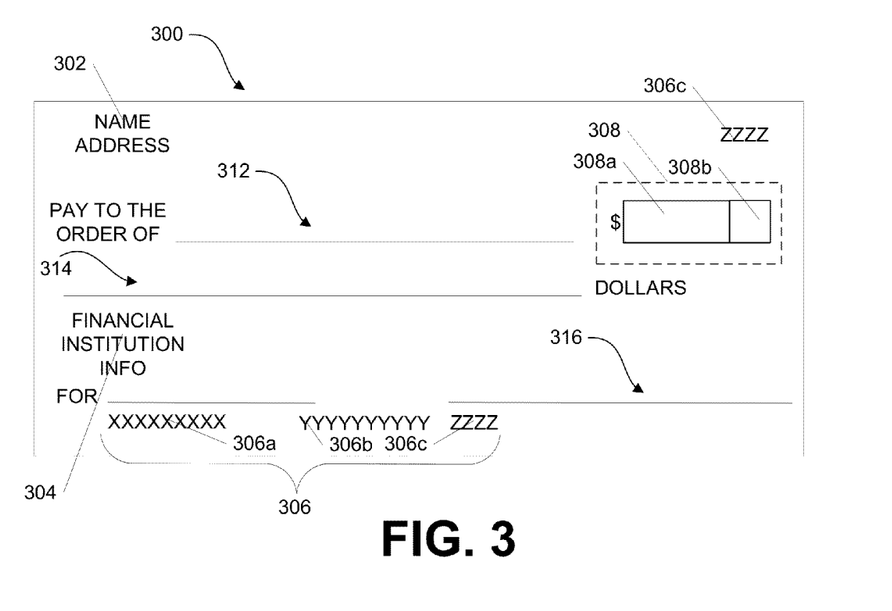
FIG. 3 illustrates an example of a negotiable instrument having a QR code arranged adjacent a convenience area according to one or more aspects described herein.

FIG. 3 illustrates one example negotiable instrument according to one or more aspects described herein. The negotiable instrument shown in FIG. 3 is a check 300, such as a personal check, but may include various other types of negotiable instruments. The check 300 includes region 302 which identifies the payor or person associated with the account on which the check is drawn. In some examples, region 302 may include a name of one or more account holders, an address of the account holder, and the like. Check 300 may also include region 304 which identifies the bank or financial institution associated with the account on which the check is drawn. In some examples, region 304 may include the name of the financial institution, address of the financial institution, and the like.

Check 300 may also include a payee region 312 in which the person to whom the check is made out is identified. Check 300 may further include check amount region 314 in which an amount of the check may be written out in words. Check 300 may further include signature line 316 on which the payor may provide his or her signature.

Region 306 of check 300 includes the MICR line. The MICR line generally includes numbers printed in magnetic ink arranged at a bottom portion of the check to facilitate automated processing of the check. The MICR line may include a routing number 306a, or other number identifying the bank or financial institution on which the check is drawn, an account number 306b at that bank or financial institution on which the check is drawn, a check number 306c and/or other information. In some examples, the check number 306c may also appear on another portion of the check (e.g., the upper right corner of the face of the check 300 as shown in FIG. 3).

Check 300 may further include image region 308 identified by the broken line box. The image region 308 may include one or more areas within the region 308 that include information that may be used to pre-process the check 300. For instance, the image region 308 may include convenience area 308a in which an amount of the check may be written, e.g., by the payor. Image region 308 may further include QR code region 308b. QR code region 308b is indicated in FIG. 3 by a blank box. However, in some arrangements, a QR code may be arranged within QR code region 308b. A QR code is a machine-readable code including black modules arranged on a white background which can be read by an imaging device, such as a camera, and processed to interpret the data contained within the QR code. In the example shown in FIG. 3, the QR code in the QR code region 308b may include data corresponding to the information contained in the MICR line 306 on the check 300. That is, the data contained in the QR code may include, among other things, the routing number 306a, account number 306b, and/or check number 306c.

In some arrangements, the QR code region 308b may be adjacent or immediately adjacent the convenience area 308a. For instance, the QR code in QR code region 308b may, in some examples, be abutting or in contact with the convenience area 308a. In other examples, the QR code may be adjacent but not in contact with the convenience area 308a. Although the QR code region is shown in FIG. 3 as being aligned with an to the right of the convenience area 308a, the QR code region 308b may, in other examples, be arranged on a left side of the convenience area 308a, above the convenience area 308a, below the convenience area 308a or offset from the convenience area 308a. The proximity of the QR code region 308b to the convenience area 308a allows a user to take an image of a portion of the check 300 that includes the image region 308 and the image may be processed to identify other information, such as routing number, account number, and the like, without requiring an image of the entire face of the check 300, as will be discussed more fully below.

Checks having features similar to those described above with respect to FIG. 3 may be processed using one or more systems, methods, apparatuses, computer-readable media, and the like, as discussed more fully below.

Figure 4:
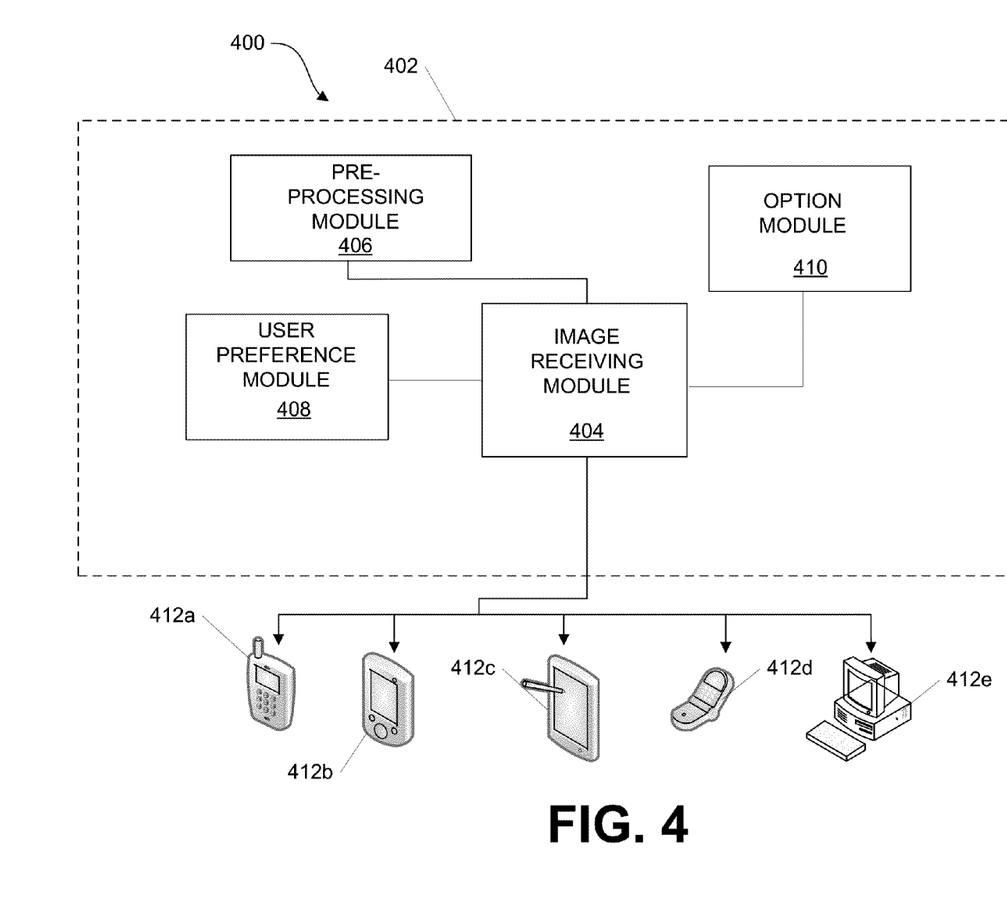
FIG. 4 illustrates one example pre-processing system according to one or more aspects described herein.

FIG. 4 illustrates one example pre-processing system 400 according to one or more aspects described herein. In some examples, the pre-processing system 400 may be part of, internal to, or associated with an entity 402. The entity 402 may be a corporation, university, government entity, and the like. In some examples, the entity 402 may be a financial institution, such as a bank. Although various aspects of the disclosure may be described in the context of a financial institution, nothing in the disclosure shall be construed as limiting the pre-processing system to use within a financial institution. Rather, the system 400 may be implemented by various other types of entities.

The pre-processing system 400 may include one or more modules that may include hardware and/or software configured to perform various functions within the system 400. The modules may be contained in a single computing device or, in some examples, some or all the modules may be contained within separate (e.g., physically separate) computing devices connected to or in communication with each other. Further, the pre-processing system 400 may operate on or be accessible via one or more computing devices, such as computing devices 412a-412e. In some examples, the pre-processing system 400 may be accessible from a website or web-banking portal operated by a financial institution. Additionally or alternatively, the system may be accessible from a mobile device, such as via a mobile banking application.

For example, the system 400 may include an image receiving module 404. The image receiving module 404 may receive, or be configured to receive, an image, such as an image of a negotiable instrument (such as check 300 in FIG. 3) or portion thereof. For example, the image receiving module 404 may receive an image of a portion of a check (e.g., image region 308 in FIG. 3) which may include a convenience area (e.g., 308a) indicating an amount of the check (e.g., numerically) and a QR code including data found in the MICR line of the check. In some examples, the image received by the image receiving module may include an image of a region including only the convenience area and the QR code. That is, a full image of the check, or portions of the check including the MICR line, payor name, payee name, signature line, and the like, might not be included in the image received by the image receiving module.

In some examples, the image may be received from a computing device, such as device(s) 412a-412e. For instance, an image of a check or other negotiable instrument may be captured by a computing device such as a smartphone 412a, personal digital assistant 412b, tablet computer 412c, cell phone 412d, or other computer terminal 412e. The image may be captured by a camera associated with the computing device 412 and may be transmitted (either via a wired or wireless connection) to the pre-processing system 400, where it may be received by the imaging receiving module 404.

The pre-processing system 400 may further include a pre-processing module 406. The pre-processing module 406 may process the image received (such as the image of the convenience area and QR code) to determine the amount of the check and the information contained in the QR code (e.g., routing number, account number, check number, and the like). The pre-processing module 406 may then determine, based, at least in part, on the information contained in the image, one or more options for further processing of the check.

For example, the pre-processing module 406 may determine whether the full amount of the check may be made available to the payee immediately upon deposit of the check or whether all or a portion of the amount will be held for a predetermined period of time. In some arrangements, a financial institution may put a hold on all or a portion of the amount of a check being deposited or cashed that is drawn on an account at, for example, another financial institution. This may permit the financial institution to verify that sufficient funds are available, that the check is genuine, and the like. In some arrangements, the amount held, period of time for which the amount is held, and the like, may depend upon the amount of the check. That is, if the amount is at or above a threshold, the check may be held for a predetermined period of time (e.g., 24 hours, 2 business days, 5 business days, and the like).

The pre-processing module 406 may alternatively determine that the full amount of the check may be available to the payee immediately upon deposit of the check. In still other arrangements, the pre-processing module 406 may begin a pre-staging process for deposit of a check at a bank or automated teller machine (ATM). For instance, if the system 400 is accessed via a mobile device, such as via a mobile banking app, the system may identify various options for further processing and, in some examples, may implement one or more options (based on e.g., user input) to pre-stage a deposit or other transaction that may be completed at, for example, an ATM. Pre-staging of the transaction may include authenticating a user, identifying an amount of the transaction, identifying an account associated with the user and/or transaction, and the like. The user may then finalize the transaction at the ATM, such as by physically depositing the check into the ATM.

Additionally or alternatively, the transaction may be completed via remote deposit check processing, or other online banking functionalities.

The pre-processing system 400 may further include option module 410. Option module 410 may be connected to or in communication with the pre-processing module 406 and the image receiving module 404 to identify and present one or more options for further processing to a user. For example, the option module 410 may generate a user interface that may be displayed via a computing device (e.g., via an online banking application, mobile banking app, and the like) and may provide one or more options to the user for selection. The user may provide input selecting one or more options and the system 400 may further process the transaction as needed.

In some examples, the option module 410 may further provide an option to cancel the transaction. For instance, if the system 400 determines that the full amount of a check will be held for a predetermine period of time and will not be immediately available to the payee, the option module 410 may provide options to continue processing the transaction (e.g., complete remote deposit, pre-stage a deposit, and the like), as well as an option to cancel the transaction. Accordingly, a user may determine that the full amount of the check will not be available and may cancel the transaction without surrendering the physical check. This is advantageous over conventional systems in which a user may insert a check into an ATM and may not be informed of the hold until the transaction is complete, or may be informed of the hold but might not be able to retrieve the physical check from the ATM once it has been inserted into the machine. Accordingly, users have more flexibility in conducting transactions.

The pre-processing system 400 may further include a user preference module 408. The user preference module 408 may receive and/or store one or more user preferences that may be implemented by the system. For instance, a user may set up one or more preferences that may be automatically implemented by the system. For example, a user may store a preference that a transaction involving deposit of any check for which the entire amount will not be immediately available will be cancelled. Accordingly, upon determining that a hold will be placed on a check for that user, the transaction may automatically be cancelled. In another example, a user may establish a preference that a transaction involving a check in which at least one half of the amount of the check will be immediately available should continue processing to pre-stage the transaction for deposit at an ATM. Various other user preferences may be received and stored by the user preference module 408 without departing from the invention.

Figure 5:
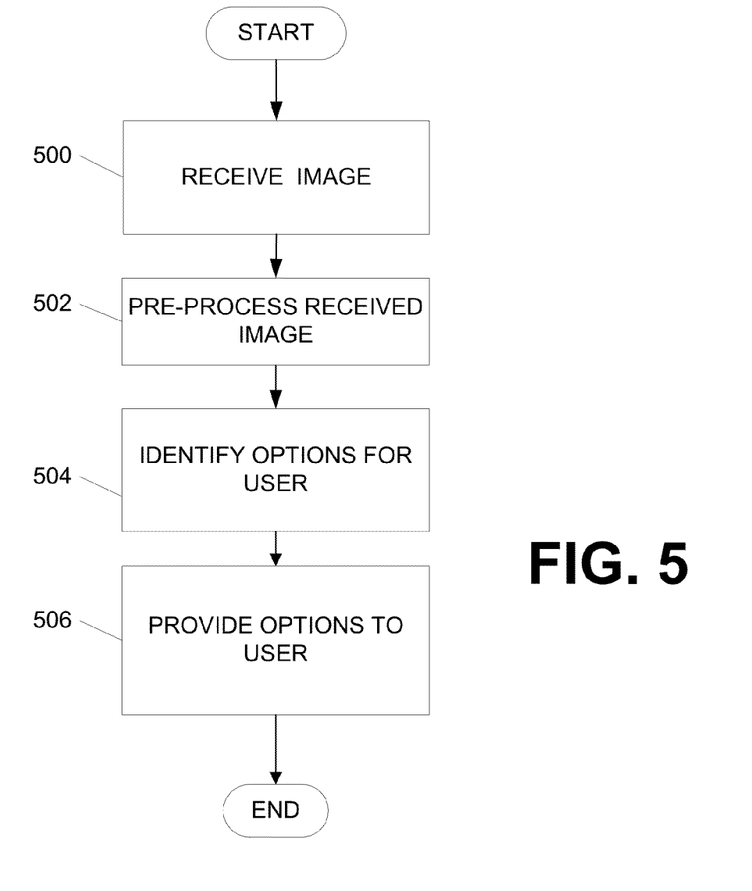
FIG. 5 is an example method of pre-processing a negotiable instrument according to one or more aspects described herein.

FIG. 5 illustrates one example method of implementing at least some aspects of the pre-processing systems described herein. In step 500, an image of a negotiable instrument, or portion thereof, may be received. As discussed above, the image may be captured with a camera, such as a camera on a mobile device, and may include a portion of the negotiable instrument including a convenience area and a QR code that includes the information contained in the MICR line of the negotiable instrument. In some examples, the negotiable instrument may be a check and the image may include only the portion of the check containing the convenience area and the QR code.

In step 502, the received image may be pre-processed to identify an amount of the check (such as the amount provided in the convenience area) and/or information provided in the QR code. For instance, pre-processing may include determining, from the data contained in the QR code, a bank identification number, such as a routing number, an account number on which the check is drawn, a check number, and the like. This information may be used to confirm the validity of the check. The information may also be used, in step 504, to identify one or more options available for continued processing. For instance, a determination may be made as to whether the full amount of the check may be available to the payee immediately upon completion of the transaction, or whether a hold may be placed on all or a portion of the amount for a predetermined time period.

Figure 6:
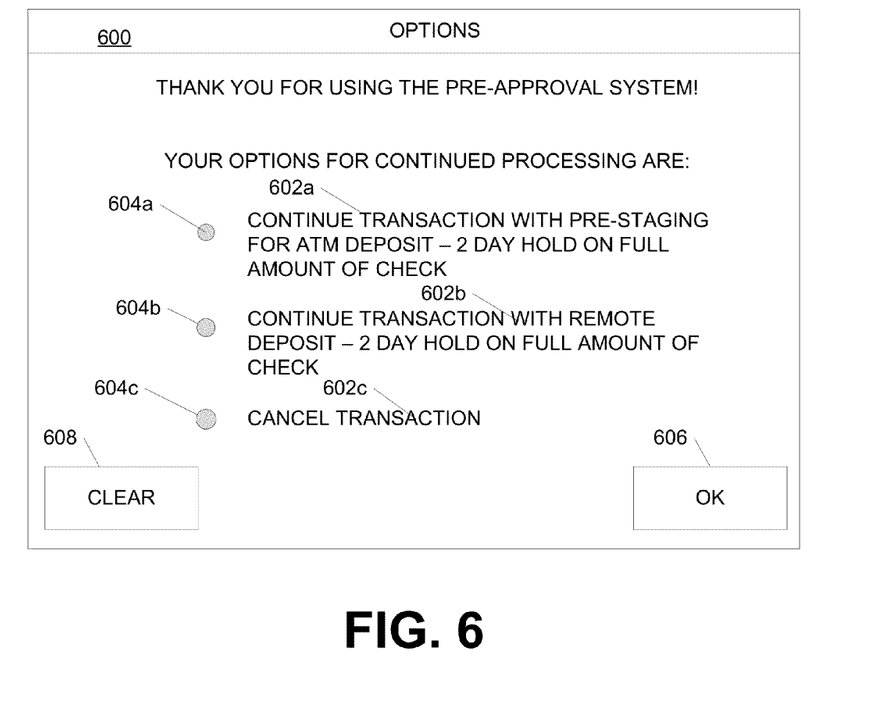
FIG. 6 is an example user interface providing options for further processing of the negotiable instrument according to one or more aspects described herein.

In step 506, the identified options may be provided to a user. For instance, a user interface may be provided to a user (e.g., via a mobile banking app on the mobile device used to capture the image of the portion of the check, via an online banking application, and the like) with various options available for selection. The options may include further processing and/or cancellation of the transaction. FIG. 6 provides one example user interface providing options for continued processing according to one or more aspects described herein.

The user interface 600 provided in FIG. 6 includes various options 602 for continued processing or cancellation of the transaction that was pre-processed, for instance, via the method described in FIG. 5. Although three options 602a-602c are provided in the user interface 600, more or fewer options may be provided without departing from the invention. Further, the options 602a-602c are merely some example options. Various other options (e.g., different hold periods, no hold period, other continued processing options, and the like) may be provided without departing from the invention.

Options 602a-602c may be selecting by selecting a radio button 604a-604c associated with one of the options. Various other methods of selection of an option (e.g., selection from a drop-down menu, clicking or double clicking the option provided, and the like) may be used without departing from the invention. Once a desired selection has been made, a user may select "OK" option 606 to continued processing the transaction (e.g., pre-stage for deposit at, for instance, an ATM, continue processing for remote deposit, and the like). Alternatively, a user may clear any selections made by selecting "CLEAR" option 608.

Figure 7:
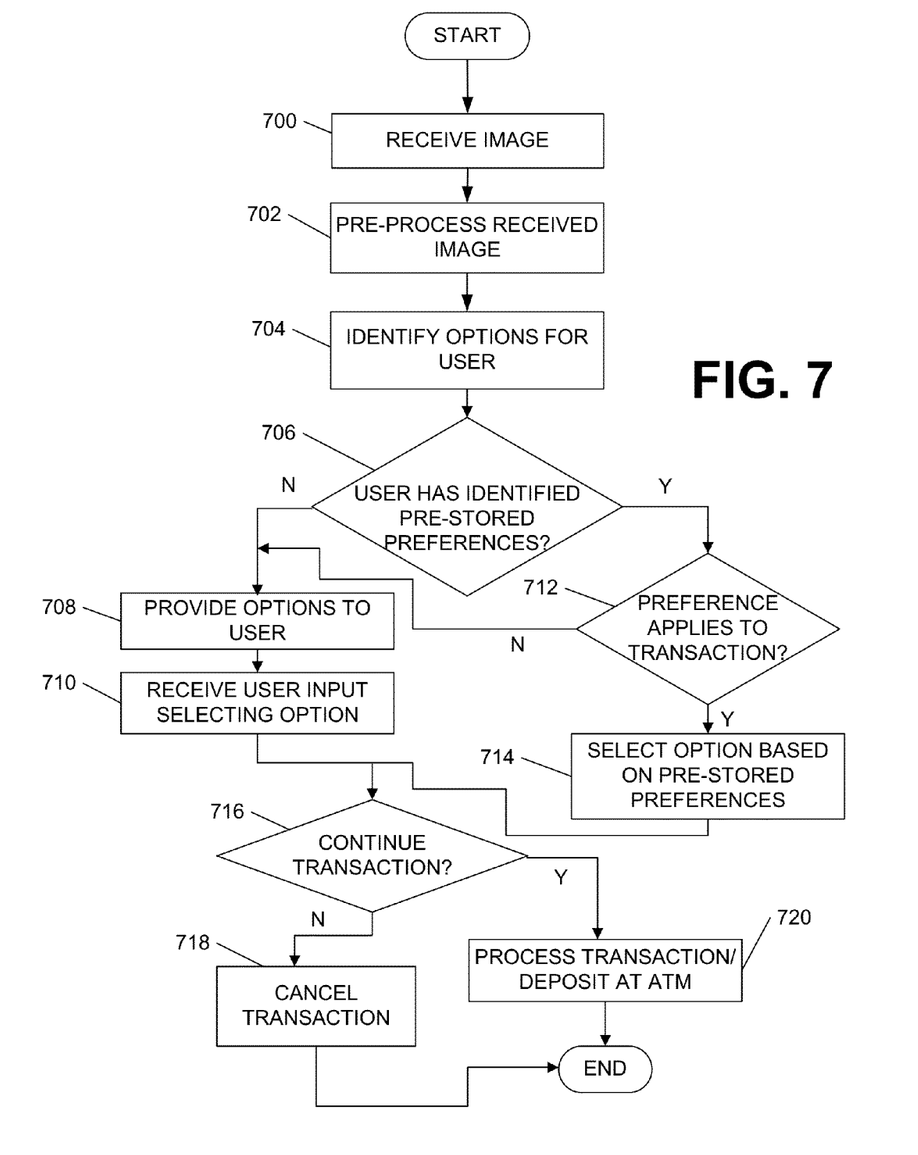
FIG. 7 is another example method of pre-processing a negotiable instrument according to one or more aspects described herein.

FIG. 7 illustrates another example method of pre-processing of transactions according to one or more aspects described herein. In step 700, an image may be received. As discussed above, the image may include a negotiable instrument, such as a check, or a portion thereof. In some examples, the image may include a convenience area and a QR code arranged adjacent to the convenience area. The QR code may include data shown on the MICR line of the check. In some arrangements, the image may include only the portion of the check including the convenience area and QR code.

In step 702, the received image may be pre-processed to determine an amount of the check (e.g., from the value written in the convenience area) and any data contained in the QR code. In step 704, one or more options for continued processing may be identified. For instance, options to pre-stage the check for later deposit (e.g., at an ATM), process the check for remote deposit (e.g., via an online banking application or mobile banking app), and the like.

In step 706, a determination is made as to whether the user has any pre-stored or predetermined user preferences. For instance, the user may provide one or more user preferences that may be automatically implemented upon the transaction meeting certain criteria. For example, if no hold will be placed on the funds associated with the check, the user may store a preference to automatically pre-stage the transaction for deposit at an ATM. Various other user preferences may be stored without departing from the invention. If, in step 706, user preferences have not been stored, then the identified option(s) may be provided to the user in step 708. As discussed above, the option may be provided via a user interface on a mobile banking app on a mobile device, online banking application, and the like. In step 710, user input may be received selecting one or more of the options provided to the user in step 708.

If, in step 706, user preferences have been stored, a determination may be made in step 712 as to whether the one or more stored user preferences apply to the transaction being pre-processed. For instance, the system may match the user preferences to one or more criteria of the transaction to determine whether any of the pre-stored user preferences apply. If, in step 706, the pre-stored user preference(s) do not apply to the transaction being pre-processed, one or more options may be provided to the user for selection in step 708.

Alternatively, if, in step 706, one or more pre-stored user preferences do apply to the transaction being pre-processed, the one or more pre-stored user preference may be automatically implemented or selected in step 714.

Upon receiving user input selecting an option to implement in 710, or upon a pre-stored user preference being automatically implemented in step 714, a determination may be made in step 716 as to whether to continue the transaction. For instance, the determination may be made as to whether the received user input or automatically implemented user preference has cancelled the transaction or selected one or more options for continued processing. If the transaction is not to be continued, the transactions and any pre-processing may be cancelled in step 718. Alternatively, if the transaction is to continue, then the additional processing may be implemented in step 720. The additional processing may include, for instance, pre-staging the check for deposit at an ATM or processing the check for remote deposit, such as via a mobile banking app or online banking application.

One example of the pre-processing system and method of implementing the system is provided below. The example is merely one example implementation and should not be construed as limiting any of the systems, methods, computer-readable media, or apparatuses described herein. Various other example implementations may be used without departing from the invention.

In one example, User A may have received a check from User B. The check includes a QR code containing all information found in the MICR line of the check adjacent to the convenience area of the check. User B's check is drawn on an account at Bank B and User A would like to cash the check at Bank A. User A would like to use the ATM at Bank A to deposit the check into an account of User A at Bank A. However, User A would like to have immediate access to the funds from the check. Accordingly, in a conventional system, once User A inserts the check into the ATM, he or she will not be able to retrieve the physical check or cancel the transaction before receiving information related to the transaction's funds availability. Thus, User A would not be able to avoid any hold on the funds.

User A then elects to pre-process the check and snaps a photo of a portion of the check using his or her mobile device. The portion of the check includes the convenience area and the QR code. The remainder of the check is not visible in the image. The image is then pre-processed to determine whether any hold will be placed on the check. The system determines that no hold will be placed on the check and User A then elects to pre-stage the check for deposit at the ATM and completes the deposit of the check.

Alternatively, if a hold will be placed on the check, User A may cancel the transaction, without having surrendered the check to the ATM, and may elect to deposit or cash the check at another financial institution (e.g., Bank B where the hold may not be necessary).

The systems, methods, apparatuses and computer-readable media described above provide various advantages over conventional systems. As discussed above, the systems, apparatuses, methods and computer-readable media may permit a user to receive information related to the transaction prior to processing a transaction. For instance, a transaction (such as cashing or depositing a check) may be pre-processed to provide a user with various options for continued processing or cancelling the transaction. If none of the options for continued processing are desirable to the user, the user may cancel the transaction without having surrendered the check.

Further, providing the QR code in an area adjacent the convenience area simplifies capturing the image. For example, conventional systems may permit processing of a check from an image of the entire first side or face of the check. Accordingly, a user must properly align the image to ensure that all aspects of the face of the check are captured. This can be time consuming and may lead to inaccuracies. The systems, methods, apparatuses and computer-readable media described herein rely on information contained in the QR code and convenience area and, thus, the image can contain only those regions, rather than requiring the entire face of the check.

Figure 8A:
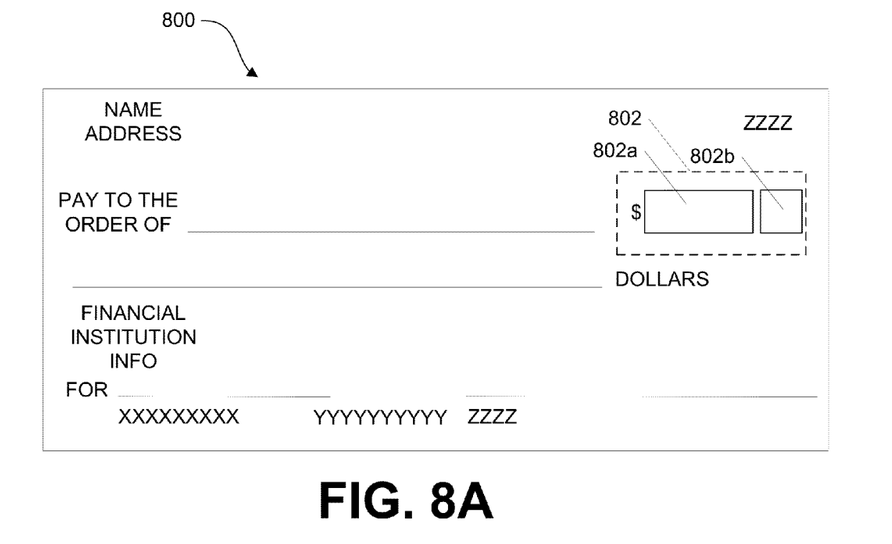
FIGS. 8A-8D illustrate various example negotiable instruments having a QR code adjacent a convenience area according to one or more aspects described herein.
Figure 8B:
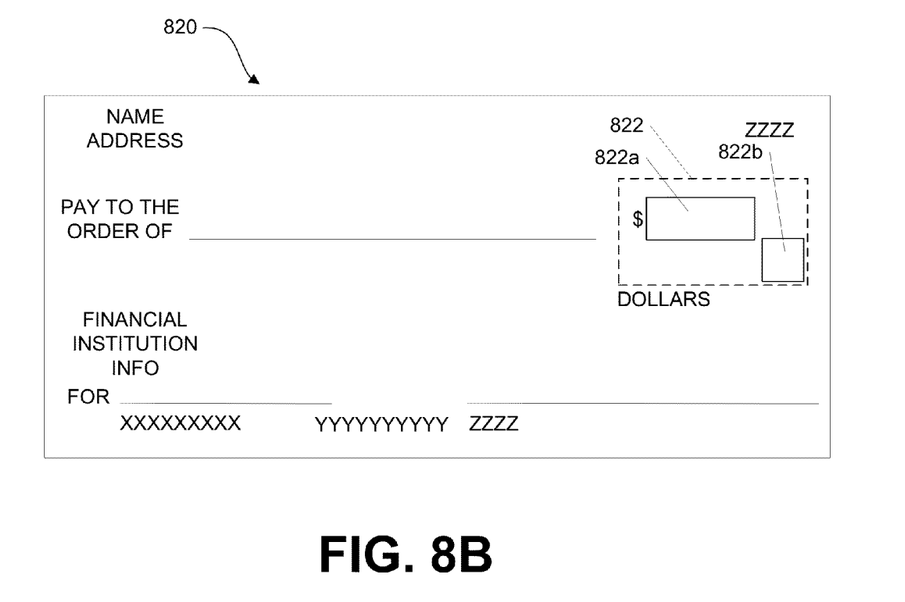

As shown in FIGS. 8A-8D, various arrangements may be used to provide the QR code adjacent the convenience area. For instance, FIG. 8A illustrates one example negotiable instrument 800 having a QR code region 802b that is adjacent to the convenience area 802a but not in contact with the convenience area. Accordingly, capturing an image of image region 802 may provide the desired information for pre-processing. FIG. 8B illustrates a negotiable instrument 820 having a QR code region 822b offset from the convenience area 822a. Accordingly, a user may simply capture an image of the image region 822 to obtain the information desired for pre-processing.

Figure 8C:
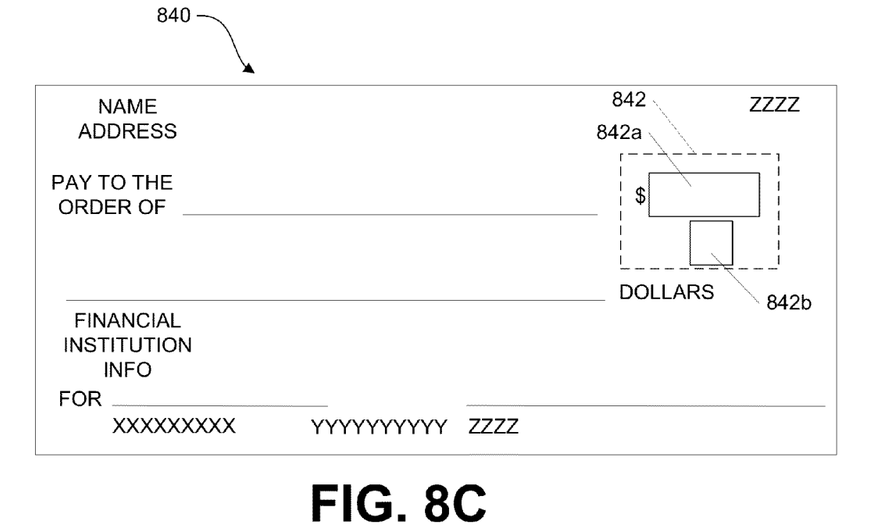
Figure 8D:
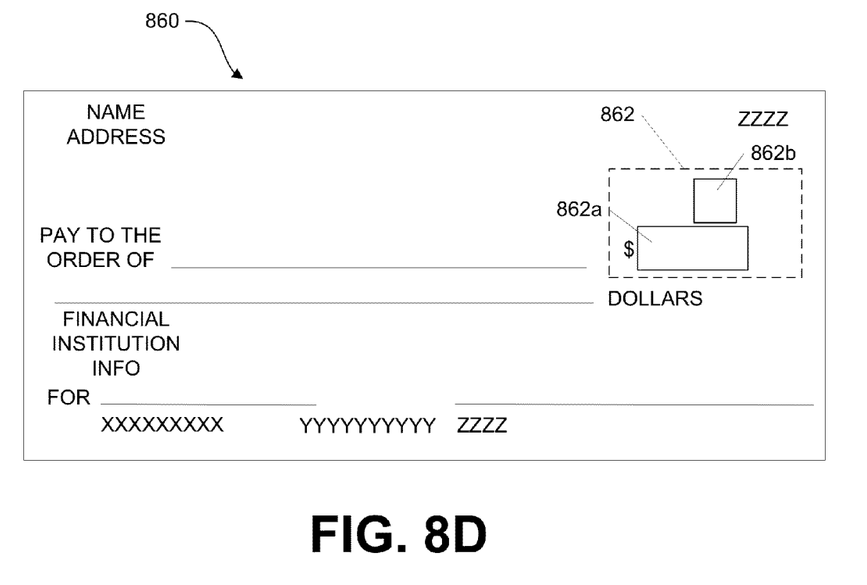

FIG. 8C illustrates a negotiable instrument 840 having a QR code region 842b below the convenience area 842a in the image region 840. FIG. 8D illustrates a negotiable instrument 860 having a QR code region 862b above the convenience area 862a in the image region.

The image region configurations, and relative positions of the QR code region and convenience area shown FIGS. 3 and 8A-8D are merely some example arrangements. Various other configurations may be used without departing from the invention. Further, any and all configurations of the QR code region and convenience area may include the QR code region adjacent the convenience area and/or abutting or in contact with the convenience area.

In still other examples, the QR code provided on the check may be a token that includes information identifying a location of information associated with the MICR line on the check. For example, the information contained in the MICR line (e.g., routing number, account number, check number, and the like) may be stored in a remote location (e.g., on the cloud). Accordingly, when the image of the QR code and convenience area is captured and processed, the QR code may identify a location of the MICR line information. However, the QR code might not contain the information itself. This may add an additional layer of security to the systems, methods, apparatuses and computer-readable media described here. In some examples, the system may require additional authentication prior to accessing the stored MICR line information (e.g., a user may input a unique identifier, password, and the like). In another example, the system may determine whether the request to access the information is being made from a recognized or pre-registered device (e.g., a user's smartphone). Accordingly, upon recognizing the device, the system may access the MICR line information in the remote storage location based on the data contained in the token QR code.

This arrangement in which the QR code acts as a token may also aid in preventing unauthorized access to an account. For example, as a user is capturing an image of the QR code and convenience area, other people in the area may be able to visibly see the MICR line information. By reducing the amount of time that the check is visible to others (e.g., by simplifying the portion of the check captured in the image), there is less likelihood that others will see the MICR line or other personal information on the check.

In still other examples, the systems, methods, apparatuses and computer-readable media provided herein may be used with checks generated by printing, such as payroll checks. The payroll checks may be generated with the QR code containing the MICR line information as well as the amount. Accordingly, a user need only capture the QR code in order to provide the information needed for processing (e.g., routing number, account number, check number, amount, and the like).

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. An apparatus, comprising:
   at least one processor; and
   a memory storing computer-readable instructions that, when executed by the at least one processor, cause the apparatus to:
   receive an image of a portion of a negotiable instrument, the portion including a quick response (QR) code and a convenience area;
   determine information associated with the negotiable instrument based on data from the QR code;
   determine an amount of the negotiable instrument based on the amount indicated in the convenience area;
   pre-process the information associated with the negotiable instrument based on data from the QR code and the determined amount to identify options to provide for available processing of the negotiable instrument; and
   provide the plurality of options for selection.

2. The apparatus of claim 1, wherein the identified options are provided for selection via a user interface associated with a mobile application.

3. The apparatus of claim 2, wherein the image is received from a mobile device and the user interface is provided via the mobile device.

4. The apparatus of claim 1, wherein the options include at least one option for further processing the negotiable instrument and an option to cancel processing of the negotiable instrument.

5. The apparatus of claim 1, wherein the negotiable instrument is a check.

6. The apparatus of claim 5, wherein at least one option of the identified options includes pre-staging the check for deposit at an automated teller machine (ATM).

7. The apparatus of claim 1, wherein the QR code includes information contained in a magnetic ink character recognition (MICR) line of the negotiable instrument.

8. The apparatus of claim 1, wherein the QR code includes at least a routing number of a financial institution on which the negotiable instrument is drawn, an account number on which the negotiable instrument is drawn and a number of the negotiable instrument.

9. The apparatus of claim 1, wherein the portion of the negotiable instrument is less than a first side of the negotiable instrument.

10. The apparatus of claim 1, wherein the image includes only the portion of the negotiable instrument including the convenience area and the QR code.

11. A method, comprising:
receiving, by a negotiable instrument pre-processing computing device having a processor, an image of a portion of a negotiable instrument, the portion including a QR code and a convenience area;
determining, by the computing device, information associated with the negotiable instrument based on data from the QR code;
determining, by the computing device, an amount of the negotiable instrument based on the amount indicated in the convenience area;
pre-processing, by the computing device, the information associated with the negotiable instrument based on data from the QR code and the determined amount to identify options to provide for available processing of the negotiable instrument; and
providing, by the computing device, the plurality of options for selection.

12. The method of claim 11, wherein the identified options are provided for selection via a user interface associated with a mobile application.

13. The method of claim 12, wherein the image is received from a mobile device and the user interface is provided via the mobile device.

14. The method of claim 11, wherein the options include at least one option for further processing the negotiable instrument and an option to cancel processing of the negotiable instrument.

15. The method of claim 11, wherein the negotiable instrument is a check and wherein at least one option of the identified options includes pre-staging the check for deposit at an automated teller machine (ATM).

16. The method of claim 11, wherein the QR code includes information contained in a magnetic ink character recognition (MICR) line of the negotiable instrument.

17. The method of claim 11, wherein the image includes only the portion of the negotiable instrument including the convenience area and the QR code.

18. One or more non-transitory computer-readable media having computer-executable instructions stored thereon that, when executed, cause at least one computing device to:
receive an image of a portion of a negotiable instrument, the portion including a QR code and a convenience area;
determine information associated with the negotiable instrument based on data from the QR code;
determine an amount of the negotiable instrument based on the amount indicated in the convenience area;
pre-process the information associated with the negotiable instrument based on data from the QR code and the determined amount to identify options to provide for available processing of the negotiable instrument; and
provide the plurality of options for selection.

19. The one or more non-transitory computer readable media of claim 18, wherein options are provided for selection via a user interface associated with a mobile application and wherein the image is received from a mobile device and the user interface is provided via the mobile device.

20. The one or more non-transitory computer readable media of claim 18, wherein the negotiable instrument is a check and wherein at least one option of the identified options includes pre-staging the check for deposit at an automated teller machine (ATM).

21. The one or more non-transitory computer readable media of claim 18, wherein the QR code includes information contained in a magnetic ink character recognition (MICR) line of the negotiable instrument.

22. The one or more non-transitory computer readable media of claim 18, wherein the image includes only the portion of the negotiable instrument including the convenience area and the QR code.

* * * * *